United States Patent
Lin et al.

(10) Patent No.: US 10,970,244 B2
(45) Date of Patent: Apr. 6, 2021

(54) SMART INTERFACE CIRCUIT

(71) Applicant: REALTEK SEMICONDUCTOR CORPORATION, Hsinchu (TW)

(72) Inventors: Chia-Hung Lin, New Taipei (TW); Min-Yu Tseng, Kaohsiung (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/747,709

(22) Filed: Jan. 21, 2020

(65) Prior Publication Data

US 2020/0242068 A1 Jul. 30, 2020

(30) Foreign Application Priority Data

Jan. 29, 2019 (TW) ................................ 108103208

(51) Int. Cl.
*G06F 13/38* (2006.01)
*G06F 13/42* (2006.01)
*G06F 13/16* (2006.01)

(52) U.S. Cl.
CPC ........ *G06F 13/387* (2013.01); *G06F 13/1684* (2013.01); *G06F 13/4221* (2013.01);
(Continued)

(58) Field of Classification Search
CPC ............... G06F 13/387; G06F 13/1684; G06F 13/4221; G06F 13/4282; G06F 2213/0026; G06F 2213/0042; G06F 2213/28
See application file for complete search history.

(56) References Cited

U.S. PATENT DOCUMENTS 6,256,687 B1 * 7/2001 Ellis ...................... G06F 13/385
710/53
7,657,692 B2 * 2/2010 Lee ...................... G06F 12/1416
710/315
(Continued)

FOREIGN PATENT DOCUMENTS

CN 108021334 A 5/2018

OTHER PUBLICATIONS

OA letter of the counterpart TW application (appl. No. 108103208) mailed on Feb. 19, 2020. Summary of the OA letter: Claims 1-10 are rejected as being anticipated by the cited reference 1 (CN108021334A, also published as US2018121106A1).
(Continued)

*Primary Examiner* — Glenn A. Auve
(74) *Attorney, Agent, or Firm* — WPAT, PC

(57) ABSTRACT

A smart interface circuit includes: a first protocol processing circuit receiving several first protocol commands including a first command and a second command from a first device, storing the commands in an instruction register that is accessible to a second protocol processing circuit, and outputting first data and second data stored in a data buffer to the first device according to the first command and the second command respectively; and the second protocol processing circuit generating X second protocol command(s) according to the first command to request a second device to output the first data to the data buffer, and before the first protocol processing circuit finishes outputting the first data to the first device, the second protocol processing circuit generating Y second protocol command(s) according to the second command to request the second device to output the second data to the data buffer.

20 Claims, 6 Drawing Sheets

(52) U.S. Cl.
CPC .. *G06F 13/4282* (2013.01); *G06F 2213/0026* (2013.01); *G06F 2213/0042* (2013.01); *G06F 2213/28* (2013.01)

(56) References Cited

U.S. PATENT DOCUMENTS

| | | | | |
|---|---|---|---|---|
| 8,838,869 | B1* | 9/2014 | Puranik | G06F 13/4022 710/315 |
| 9,471,526 | B2* | 10/2016 | Lin | G06F 13/4027 |
| 9,804,824 | B1* | 10/2017 | Ning | G06F 5/12 |
| 9,934,177 | B2* | 4/2018 | Goren | G06F 3/067 |
| 10,055,142 | B1* | 8/2018 | Bates | G06F 3/0679 |
| 2010/0122021 | A1* | 5/2010 | Lee | G06F 3/0661 711/103 |
| 2010/0174835 | A1* | 7/2010 | Chung | G06F 13/387 710/15 |
| 2013/0013842 | A1* | 1/2013 | Numamoto | G06F 13/4022 710/316 |
| 2013/0132634 | A1* | 5/2013 | Liu | H04L 49/35 710/308 |
| 2016/0306757 | A1* | 10/2016 | McCabe | G06F 13/28 |
| 2017/0068635 | A1* | 3/2017 | Vajravel | G06F 3/0665 |
| 2018/0121106 | A1 | 5/2018 | Kim | |

OTHER PUBLICATIONS

NVM Express, Inc., "NVMe revision 1.3 specification" Mar. 1, 2017. info@nvmexpress.org. https://nvmexpress.org/wp-content/uploads/NVM_Express_Revision_1.3.pdf.

T10, Technical Committee of Accredited Standards Committee INCITS, Technical Editor Curtis E. Stevens, "dpANS Project American National Standard—T10-2095-D" UAS Spec. Revision 4. Mar. 9, 2010.

* cited by examiner

SMART INTERFACE CIRCUIT

BACKGROUND OF THE INVENTION

1. Field of the Invention

The present invention relates to an interface circuit, especially to a smart interface circuit.

2. Description of Related Art

The USB (Universal Serial Bus) to PCIe (Peripheral Component Interconnect Express) adapter technique follows the UAS (USB Attached SCSI (Small Computer System Interface)) protocol and NVMe (Non-Volatile Memory Express) protocol. The two protocols are described in brief below.
(1) UAS protocol: This protocol specifies the way to exchange data between a USB host (e.g., a personal computer) and a USB device (i.e., a USB-to-PCIe adapter functioning as a USB device here), the way including:
   (i) the USB host (a.k.a. a UAS initiator port) transmitting a COMMAND IU (Command Information Unit) to the USB device;
   (ii) after the USB device (a.k.a. a UAS target port) is available to execute instructions, the USB device replying to the USB host with a WRITE/READ READY IU and then the both sides starting exchanging data; and
   (iii) after the data exchange is finished, the USB device transmitting a SENSE IU to the USB host to indicate that the COMMAND IU has been executed.
(2) NVMe protocol: This protocol specifies the way to exchange data between an NVMe host (i.e., a USB-to-PCIe adapter functioning as an NVMe host here) and an NVMe controller (e.g., the NVMe controller of an NMVe storage device), the way including:
   (i) the NVMe host preparing one or more instructions and putting them in a submission queue;
   (ii) the NVMe host updating a submission queue tail doorbell signal of the NVMe controller;
   (iii) the NVMe controller retrieving one or more instructions from the submission queue of the NVMe host;
   (iv) the NVMe controller executing the retrieved instruction(s);
   (v) after the NVMe controller finishing executing the retrieved instruction(s), the NVMe controller transmitting the result(s) to a completion queue of the NVMe host;
   (vi) using a pin-based interrupt (INTx)/message signaled interrupt (MSI)/MSI-X to notify the NVMe host that the retrieved instruction(s) has been executed;
   (vii) the NVMe host processing the result(s) in the completion queue; and
   (viii) updating a completion queue head doorbell signal of the NVMe controller.

Regarding the circumstance of a USB host reading data from an NVMe storage device under the UAS protocol, before a USB device (i.e., a known USB-to-PCIe adapter functioning as a USB device here) processes a next read command information unit (READ COMMAND IU), the USB device must finish processing a current READ COMMAND IU; accordingly, before an NVMe host (i.e., the known USB-to-PCIe adapter functioning as an NVMe host here) transmits a doorbell signal (named "second doorbell signal") to the NVMe storage device in response to the next READ COMMAND IU to request the NVMe storage device to provide the data (named "second data") mentioned by the next READ COMMAND IU for the NVMe host, the USB device must transmit a status notification (SENSE IU) to notify the USB host that the data (named "first data") mentioned by the current READ COMMAND IU has been completely outputted. Since the transmission speed of a PCIe interface is higher than the transmission speed of a USB interface, at the moment the NVMe storage device finishes outputting the first data to the NVMe host, normally the USB device has not finished outputting the first data to the USB host yet; therefore, the NVMe host has to wait for a while before transmitting the second doorbell signal to the NVMe storage device, which wastes the PCIe transmission bandwidth. In addition, after the NVMe storage device receives the second doorbell signal, it takes a responding time (e.g., 5 µs~50 µs) before the NVMe storage device starts retrieving the instructions from the NVMe host and executing them (i.e., outputting the second data to the NVMe host). In light of the above, before the NVMe host (i.e., the known USB-to-PCIe adapter functioning as the NVMe host here) receives the second data, the USB device (i.e., the USB-to-PCIe known adapter functioning as the USB device here) has no data to be outputted to the USB host and is idle, which wastes the USB transmission bandwidth.

SUMMARY OF THE INVENTION

An object of the present disclosure is to provide a smart interface circuit. Compared with the prior art, the smart interface circuit can accelerate data reading operation to reduce the waste of transmission bandwidth.

An embodiment of the smart interface circuit of the present disclosure is configured to couple a USB interface with a PCIe interface, the smart interface circuit including an UAS (USB Attached SCSI) protocol processing circuit, an instruction register, a data buffer, and an NVMe (Non-Volatile Memory Express) protocol processing circuit. The UAS protocol processing circuit is used for outputting data to a host according to the request of the host; more specifically, the UAS protocol processing circuit is configured to execute at least the following steps: receiving a plurality of UAS commands from the host via the USB interface, the plurality of UAS commands including a first UAS command and a second UAS command that are used for reading first stored data and second stored data respectively; storing the plurality of UAS commands in the instruction register; transmitting a first read-ready signal to the host according to the first UAS command; after transmitting the first read-ready signal, outputting the first stored data stored in a data buffer to the host, and after finishing outputting the first stored data to the host, transmitting a first status notification to the host; after transmitting the first status notification, transmitting a second read-ready signal to the host according to the second UAS command; and after transmitting the second read-ready signal, outputting the second stored data stored in the data buffer to the host, and after finishing outputting the second stored data to the host, transmitting a second status notification to the host. The instruction register is configured to provide the plurality of UAS commands for the NVMe protocol processing circuit. The data buffer is configured to store the first stored data and the second stored data come from a storage device. The NVMe protocol processing circuit is used for reading data from the storage device according to the plurality of UAS commands; more specifically, the NVMe protocol processing circuit is configured to execute at least the following steps: generating X NVMe command(s) according to the first UAS command, in which the X is a positive integer; transmitting X doorbell signal(s) to the storage device via the PCIe interface and thereby requesting the storage device to output the first stored data to the data buffer through the NVMe protocol processing circuit according to the X NVMe command(s); generating Y NVMe command(s) according to the second UAS command, in which the Y is a positive integer; and before transmitting the second read-ready signal, transmitting Y doorbell signal(s) to the storage device via the PCIe interface and thereby early requesting the storage device to output the second stored data to the data buffer through the NVMe protocol processing circuit according to the Y NVMe command(s).

Another embodiment of the smart interface circuit of the present disclosure is configured to couple a first interface with a second interface, the smart interface circuit including a first protocol processing circuit, an instruction register, a data buffer, and a second protocol processing circuit. The first protocol processing circuit is configured to receive a plurality of first protocol commands including a first command and a second command from a first device via the first interface and store the plurality of first protocol commands in an instruction register, and the first protocol processing circuit is also configured to output first data and second data stored in a data buffer to the first device according to the first command and the second command respectively. The instruction register is configured to provide the plurality of first protocol commands for the second protocol processing circuit. The data buffer is configured to store the first data and the second data come from a second device. The second protocol processing circuit is configured to generate X second protocol command(s) according to the first command and thereby requesting the second device to output the first data to the data buffer through the second protocol processing circuit; and the second protocol processing circuit is also configured to generate Y second protocol command(s) according to the second command before the first protocol processing circuit notifies the first device that the first data have been completely outputted, and thereby early request the second device to output the second data to the data buffer through the second protocol processing circuit, wherein each of the X and the Y is a positive integer.

These and other objectives of the present invention will no doubt become obvious to those of ordinary skill in the art after reading the following detailed description of the preferred embodiments that are illustrated in the various figures and drawings.

BRIEF DESCRIPTION OF THE DRAWINGS

FIG. 3b shows an exemplary implementation of the data buffer of FIG. 3a.

DETAILED DESCRIPTION OF THE PREFERRED EMBODIMENTS

The smart interface circuit of the present disclosure can accelerate data access operation in comparison with the prior art, and thereby reduce the waste of transmission bandwidth.

Figure 1:
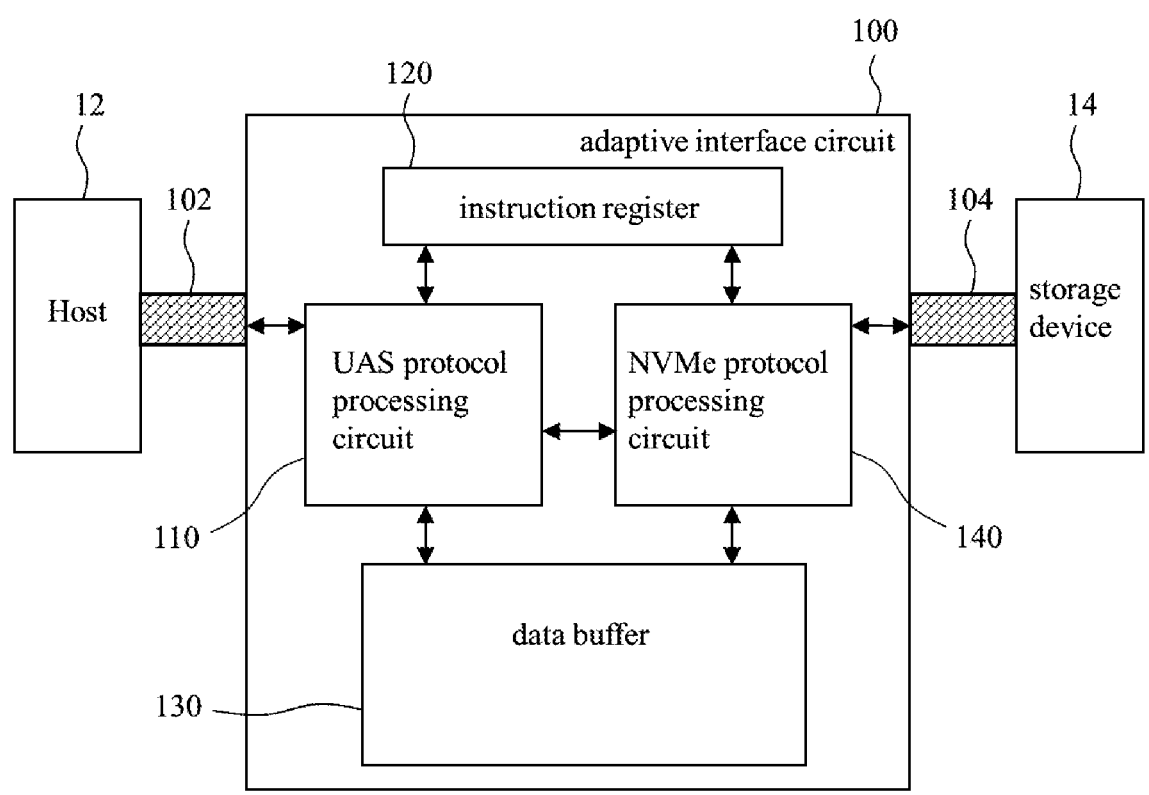
FIG. 1 shows an embodiment of the smart interface circuit of the present invention.
Figure 2:
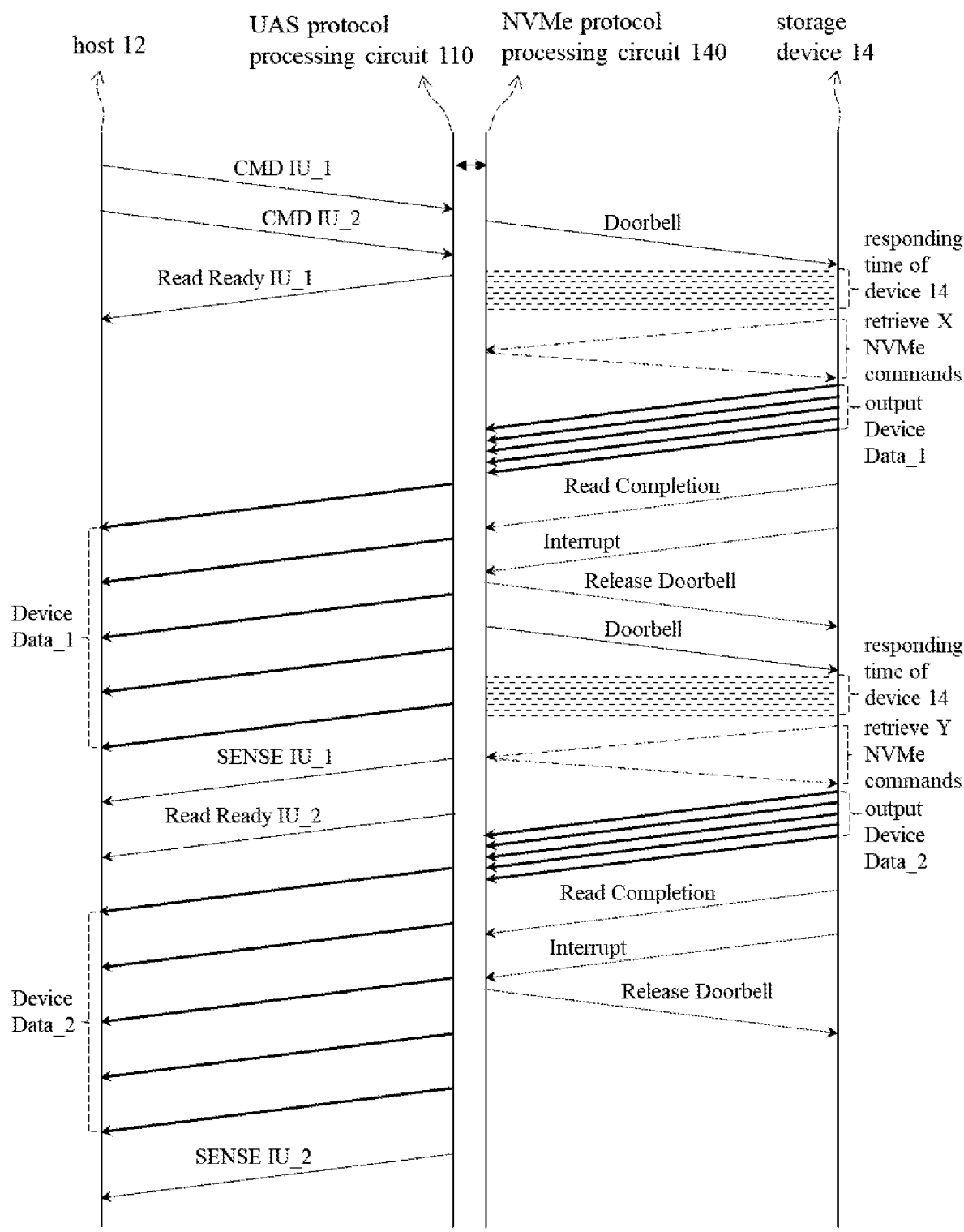
FIG. 2 illustrates the communication procedures of the smart interface circuit of FIG. 1.

FIG. 1 shows an embodiment of the smart interface circuit of the present disclosure; and FIG. 2 illustrates the communication procedures of the smart interface circuit 100 of FIG. 1, wherein the vertical direction of FIG. 2 can be deemed the direction of a time axis. The smart interface circuit 100 is configured to couple a first interface 102 with a second interface 104, and includes a first protocol processing circuit 110 (e.g., a UAS (USB Attached SCSI) protocol processing circuit), an instruction register 120, a data buffer 130, and a second protocol processing circuit 140 (e.g., an NVMe (Non-Volatile Memory Express) protocol processing circuit).

Please refer to FIGS. 1-2. The first protocol processing circuit 110 is configured to output data to a first device 12 (e.g., a host such as a personal computer) according to the request of the first device 12. In detail, the first protocol processing circuit 110 is configured to receive a plurality of first protocol commands including a first command (CMD IU_1) and a second command (CMD IU_2) from the first device 12 via the first interface 102 and then store the plurality of first protocol commands in the instruction register 120. The first command and second command are used for reading first data (Device Data_1) and second data (Device Data_2) respectively; more specifically, the first protocol processing circuit 110 is configured to output the first data and second data stored in the data buffer 130 to the first device 12 according to the first command and second command respectively.

Please refer to FIGS. 1-2. The instruction register 120 is configured to provide the plurality of first protocol commands for the second protocol processing circuit 140; for instance, the second protocol processing circuit 140 checks whether any first protocol command for the second protocol processing circuit 140 is stored in the instruction register 120 and thereby retrieves the command(s), if any. The data buffer 130 is configured to store the first data and second data from a second device 14.

Please refer to FIGS. 1-2. The second protocol processing circuit 140 is used for reading data from the second device 14 via the second interface 104 according to the plurality of first protocol commands. In detail, the second protocol processing circuit 140 is configured to generate X second protocol command(s) and Y second protocol command(s) according to the first command and second command of the plurality of first protocol commands respectively; for instance, the second protocol processing circuit 140 splits the first command and thereby generates the X second protocol commands to prevent the quantity of data requested by a single second protocol command from being oversized, and the second protocol processing circuit 140 splits the second command to generate the Y second protocol commands for the same reason. The X second protocol command(s) is/are used for requesting the second device 14 to output the first data to the data buffer 130 through the second protocol processing circuit 140; and before the first protocol processing circuit 110 notifies the first device 12 that the first data have been completely outputted, the Y second protocol command(s) are already used for requesting the second device 14 to output the second data to the data buffer 130 through the second protocol processing circuit 140, wherein each of the X and the Y is a positive integer (e.g., an integer greater than one). It should be noted that in this embodiment, before the second protocol processing circuit 140 starts generating the Y second protocol command(s), the second protocol processing circuit 140 has finished receiving the first data from the second device 14; however, this is not a limitation on the scope of the present invention. It should also be noted that each of the X and Y in the communication procedures of FIG. 2 is one in order to prevent the drawing of FIG. 2 from being complicated; however, this is for understanding rather than restriction.

On the basis of the above, the first protocol processing circuit 110 transmits a first/second read-ready signal (Read Ready IU_1/Read Ready IU_2) according to the first/second command and thereby allows the first device 12 to receive the first/second data from the smart interface circuit 100; additionally, the first protocol processing circuit 110 transmits a first/second status notification (SENSE IU_1/SENSE IU_2) to notify the first device 12 that the reading process of the first/second data has been done. In an exemplary implementation, the first protocol processing circuit 110 transmits the first/second status notification to the first device 12 according to a first/second completion notification (i.e., Read Completion and/or Interrupt of FIG. 2) from the second device 14. Regarding the second protocol processing circuit 140, it transmits a doorbell signal (Doorbell) to the second device 14 via the second interface 12 and thereby requests the second device 14 to retrieve and execute at least one second protocol command from the second protocol processing circuit 140, which lets the second device 14 output data to the data buffer 130 via the second protocol processing circuit 140. In an exemplary implementation, each second protocol command is associated with a doorbell signal and thus the X second protocol command(s) is/are associated with X doorbell signal(s) and the Y second protocol command(s) is/are associated with Y doorbell signal(s); accordingly, the second protocol processing circuit 140 transmits one doorbell signal to the second device 14 according to one second protocol command, the second device 14 retrieves and executes the second protocol command in response to the doorbell signal, and then the second device 14 outputs the data mentioned by the second protocol command to the data buffer 130 via the second protocol processing circuit 140. In an exemplary implementation, if the communication protocol between the smart interface circuit 100 and the second device 14 permits, the X second protocol command(s) relate(s) to M doorbell signal(s) while the M is a positive integer not greater than the X (e.g., M<X); accordingly, one doorbell signal may relate to one or more second protocol commands according to the demand for implementation. In an exemplary implementation, before the first protocol processing circuit 110 transmits the second read-ready signal or the second status notification, the second protocol processing circuit 140 has already started transmitting a doorbell signal to the second device 14 via the second interface 104 so as to early request the second device 14 to start retrieving and executing the Y second protocol command(s), and consequently the second device outputs the second data to the data buffer 130 via the second protocol processing circuit 140 early. In light of the above, the waste of transmission bandwidth induced by waiting and idle time as mentioned in the description of related art of this specification can be reduced.

For a better understanding, in the following description the first interface 102 is a USB (Universal Serial Bus) interface 102, the second interface 104 is a PCIe (Peripheral Component; Interconnect Express) interface 104, the first device 12 is a host 12 (e.g., a personal computer), the second device 14 is a storage device 14 (e.g., a solid-state driver (SSD)), the first data and second data are the first stored data and second stored data stored in the storage device 14 respectively, the first protocol processing circuit 110 is a UAS (USB Attached SCSI (Small Computer System Interface)) protocol processing circuit 110, the second protocol processing circuit 140 is an NVMe (Non-Volatile Memory Express) protocol processing circuit 130, the first protocol command is a UAS command, and each second protocol command(s) is an NVMe command; however, the scope of the present invention is not limited thereto.

Figure 3A:
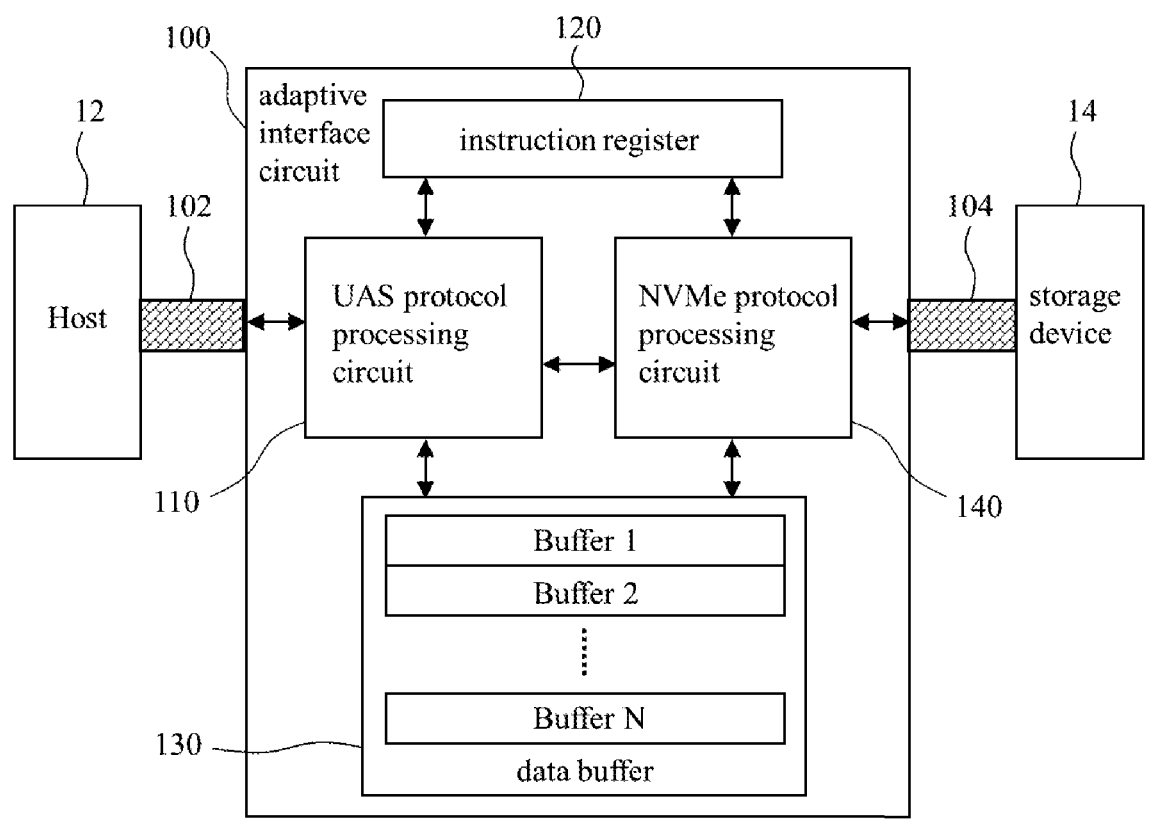
FIG. 3a shows an embodiment of the data buffer of FIG. 1.
Figure 3B:
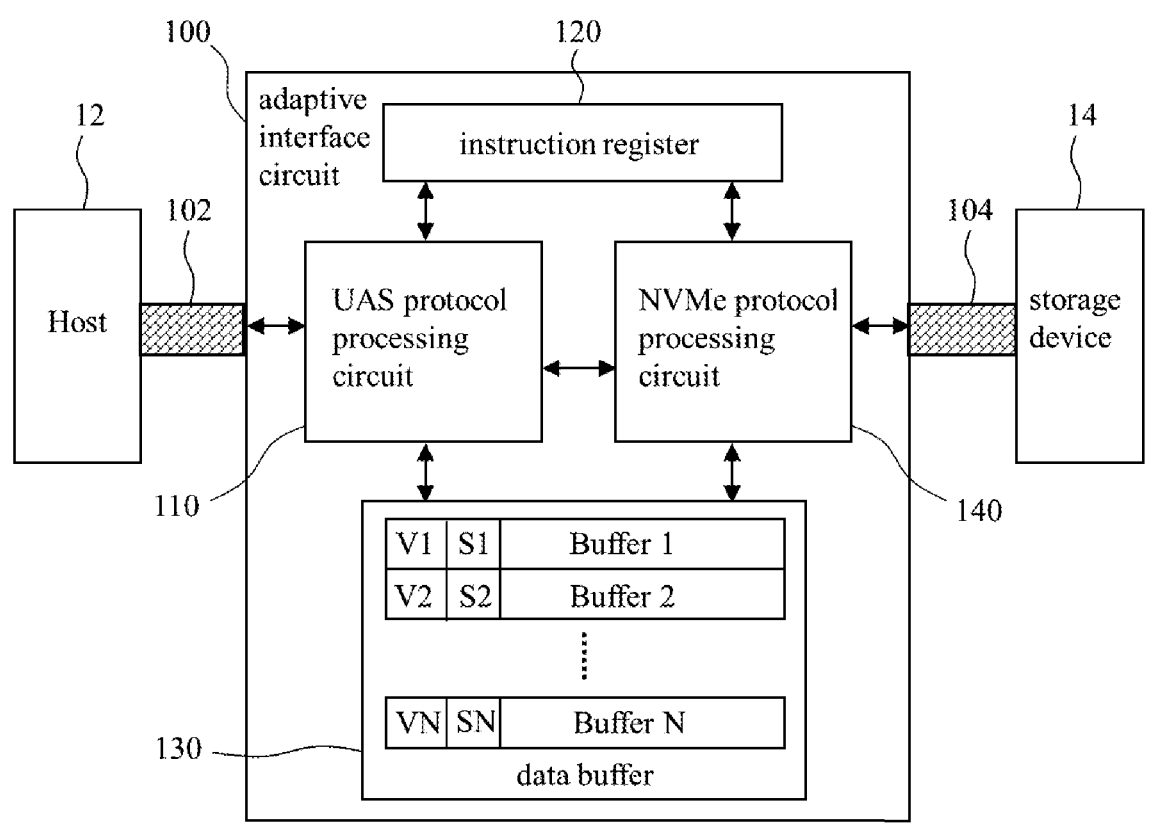

FIG. 3a shows an embodiment of the data buffer 130 of FIG. 1. The data buffer 130 of FIG. 3a includes N storage spaces (i.e., Buffer 1~Buffer N), in which the N is an integer greater than one. Both the UAS protocol processing circuit 110 and NVMe protocol processing circuit 140 can detect the usage state of each storage space for utilization. For instance, as shown in FIG. 3b and Table 1 below, each storage space is tagged with an effective flag (i.e., $V_K$, in which the suffix K is a positive integer not greater than the N and thus $V_K$ stands for one of $V_1$~$V_N$) and a transmission flag (i.e., $S_K$, in which the suffix K is a positive integer not greater than the N and thus $S_K$ stands for one of $S_1$~$S_N$) that are indicative of the usage state of the storage space. The first value (e.g., 0) of $V_K$ indicates that a $K^{th}$ storage space of the N storage spaces is not occupied by to-be-retrieved data (i.e., at least a part of the first/second data); the second value (e.g., 1) of $V_K$ indicates that the $K^{th}$ storage space is occupied. The first value (e.g., 0) of $S_K$ indicates that the $K^{th}$ storage space is not access-pending, which means that the $K^{th}$ storage space is not related to any of the X/Y NVMe command(s) or a doorbell signal associated with an NVMe command for retrieving the data of the $K^{th}$ storage space has been transmitted to the storage device 14; the second value (e.g., 1) of $S_K$ indicates that the $K^{th}$ storage space is access-pending, which means that the $K^{th}$ storage space is related to one of the X/Y NVMe command(s) and a doorbell signal associated with this NVMe command has not been transmitted to the storage device 14 yet. X/Y storage space(s) of the N storage spaces is/are related to the X/Y NVMe command(s) one-on-one.

TABLE 1

| $V_K$ | $S_K$ | usage state of storage space |
|---|---|---|
| 0 | 0 | having no to-be-retrieved data; not access-pending |
| 0 | 1 | having no to-be-retrieved data; access-pending |
| 1 | 0 | having to-be-retrieved data; not access-pending |
| 0 | 0 | having no to-be-retrieved data; not access-pending |

Figure 4:
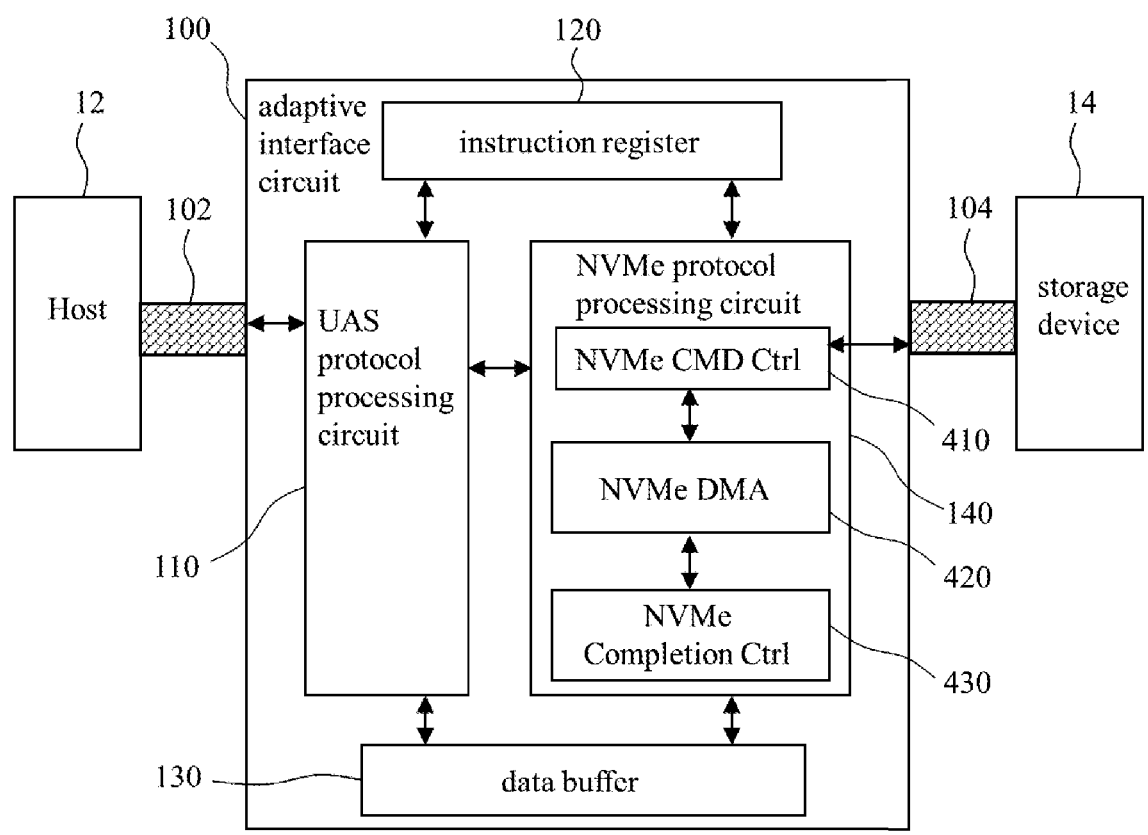
FIG. 4 shows an embodiment of the NVMe protocol processing circuit.
Figure 5:
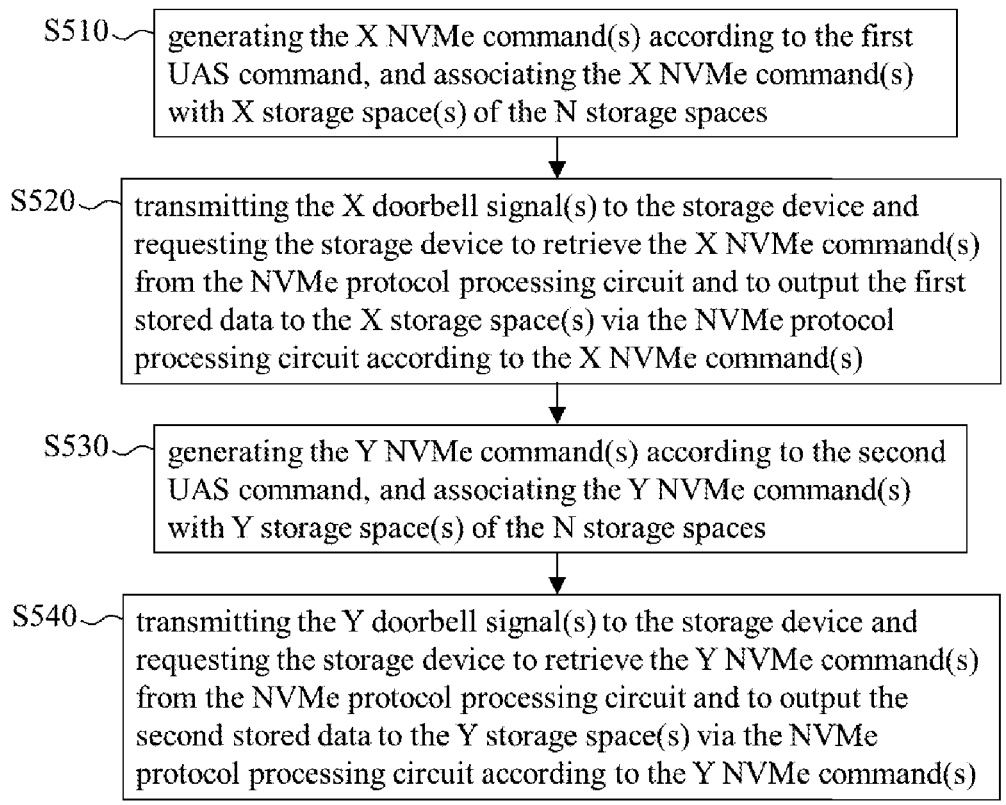
FIG. 5 shows the steps executed by the NVMe command control circuit of FIG. 4.

FIG. 4 shows an embodiment of the NVMe protocol processing circuit 140 of FIG. 1. The NVMe protocol processing circuit 140 of FIG. 4 includes an NVMe command control circuit (NVMe CMD Ctrl) 410, an NVMe direct memory access control circuit (NVMe DMA) 420, and an NVMe completion control circuit (NVMe Completion Ctrl) 430. In an exemplary implementation, the NVMe command control circuit 410 is configured to execute at least the following steps as shown in FIG. 5:

step S510: generating the X NVMe command(s) according to the first UAS command, and associating the X NVMe command(s) with X storage space(s) of the N storage spaces. For instance, before the X storage space(s) is/are associated with the X NVMe command(s), the X storage space(s) store(s) no to-be-retrieved data and is/are not associated with any X NVMe command(s); therefore the NVMe command control circuit 410 is allowed to associate the X NVMe command(s) with the X storage space(s) according to the usage state(s) of the X storage space(s). In an exemplary implementation, the NVMe command control circuit 410 detects the usage state of each of the X storage space(s) according to its effective flag and transmission flag.

step S520: transmitting the X doorbell signal(s) to the storage device 14 and thereby requesting the storage device 14 to retrieve the X NVMe command(s) from the NVMe protocol processing circuit 140 and to output the first stored data to the X storage space(s) via the NVMe protocol processing circuit 140 according to the X NVMe command(s). For instance, the X is greater than one, the X NVMe commands include the address information (e.g., pointer information of a FIFO) of the X storage spaces respectively so as to allow the storage device 14 to generate X signals including the address information of the X storage spaces respectively; afterwards the NVMe direct memory access control circuit 420 can put the first stored data in the X storage spaces according to the X signals.

step S530: generating the Y NVMe command(s) according to the second UAS command, and associating the Y NVMe command(s) with Y storage space(s) of the N storage spaces. For instance, before the Y storage space(s) is/are associated with the Y NVMe command(s), the Y storage space(s) store(s) no to-be-retrieved data and is/are not associated with any NVMe command(s); therefore the NVMe command control circuit 410 is allowed to associate the Y NVMe command(s) with the Y storage space(s) according to the usage state(s) of the Y storage space(s). In an exemplary implementation, the NVMe command control circuit 410 detects the usage state of each of the Y storage space(s) according to its effective flag and transmission flag.

step S540: transmitting the Y doorbell signal(s) to the storage device 14 and thereby requesting the storage device 14 to retrieve the Y NVMe command(s) from the NVMe protocol processing circuit 140 and to output the second stored data to the Y storage space(s) via the NVMe protocol processing circuit 140 according to the Y NVMe command(s). For instance, the Y is greater than one, the Y NVMe commands include the address information of the Y storage spaces respectively so as to allow the storage device 14 to generate Y signals including the address information of the Y storage spaces respectively; afterwards the NVMe direct memory access control circuit 420 can put the second stored data in the Y storage spaces according to the Y signals.

The following implementation are based on the above description. In an exemplary implementation, the NVMe completion control circuit 430 is configured to reset all usage state(s) of the X/Y storage space(s) after the first/second stored data are put in the X/Y storage space(s); for instance, the NVMe completion control circuit 430 makes the values of the effective flag(s) and transmission flag(s) of the X/Y storage space(s) be zero so as to reset the usage state(s) of the X/Y storage space(s). In an exemplary implementation, the NVMe completion control circuit 430 resets the usage state of a storage space according to a completion notification from the storage device 14 and transmits a release doorbell signal to the storage device 14 to start the next round of communication or wait for it. In an exemplary implementation, after the NVMe completion control circuit 430 finishes receiving the first stored data and transmitting a release doorbell signal to the storage device 14, the NVMe command control circuit 430 starts transmitting the Y doorbell signal(s) to the storage device 14 without regard to progress of the UAS protocol processing circuit 110 transmitting the first stored data, so as to early request the storage device 14 to output the second stored data. Since the data transmission speed of a USB interface is slower than the data transmission speed of a PCIe interface, before the UAS protocol processing circuit 110 completely outputs the first stored data to the host 12, the NVMe protocol processing circuit 140 can start transmitting the Y doorbell signal(s) without waiting the first stored data being transferred completely so as to early request the second device 14 to provide the second stored data; this reduces the waste of transmission bandwidth induce by waiting and idle time.

Since the smart interface circuit 100 is a digital circuit, people of ordinary skill in the art can realize the digital design and circuit production of the smart interface circuit 100 by referring to the present disclosure, the teaching and requirement of the UAS and NVMe protocols, and the known techniques; therefore redundant description is omitted here.

It should be noted that people of ordinary skill in the art can implement the present invention by selectively using some or all of the features of any embodiment in this specification or selectively using some or all of the features of multiple embodiments in this specification as long as such implementation is practicable, which implies that the present invention can be carried out flexibly.

To sum up, the smart interface circuit of the present disclosure can accelerate data access operation by the early transmission of a doorbell signal, and thereby improve the utilization rate of transmission bandwidth.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. An interface circuit configured to couple a Universal Serial Bus (USB) interface with a Peripheral Component Interconnect Express (PCIe) interface, the interface circuit comprising:
   a USB Attached SCSI (UAS) protocol processing circuit;
   an instruction register configured to provide a plurality of UAS commands of a host for a Non-Volatile Memory Express (NVMe) protocol processing circuit;
   a data buffer configured to store first stored data and second stored data from a storage device; and
   an NVMe protocol processing circuit,
   wherein the UAS protocol processing circuit is configured to execute at least following steps:
      receiving the plurality of UAS commands of the host via the USB interface, the plurality of UAS commands of the host including a first UAS command and a second UAS command for reading the first stored data and the second stored data respectively;
      storing the plurality of UAS commands of the host in the instruction register;
      transmitting a first read-ready signal to the host according to the first UAS command;

after transmitting the first read-ready signal, outputting the first stored data stored in a data buffer to the host, and after finishing outputting the first stored data to the host, transmitting a first status notification to the host;

after transmitting the first status notification, transmitting a second read-ready signal to the host according to the second UAS command; and after transmitting the second read-ready signal, outputting the second stored data stored in the data buffer to the host, and after finishing outputting the second stored data to the host, transmitting a second status notification to the host;

and wherein the NVMe protocol processing circuit is configured to execute at least following steps:

generating X NVMe command(s) according to the first UAS command, in which the X is a positive integer;

transmitting X doorbell signal(s) to the storage device via the PCIe interface and thereby requesting the storage device to output the first stored data to the data buffer through the NVMe protocol processing circuit according to the X NVMe command(s);

generating Y NVMe command(s) according to the second UAS command, in which the Y is a positive integer; and before transmitting the second read-ready signal, transmitting Y doorbell signal(s) to the storage device via the PCIe interface and thereby requesting the storage device to output the second stored data to the data buffer through the NVMe protocol processing circuit according to the Y NVMe command(s).

2. The interface circuit of claim 1, wherein the NVMe protocol processing circuit checks the instruction register to obtain the plurality of UAS commands of the host.

3. The interface circuit of claim 1, wherein before the UAS protocol processing circuit transmits the first status notification, the NVMe protocol processing circuit starts transmitting the Y doorbell signal(s) to the storage device.

4. The interface circuit of claim 1, wherein the UAS protocol processing circuit transmits the first status notification to the host according to a first completion notification from the storage device, and the UAS protocol processing circuit transmits the second status notification to the host according to a second completion notification from the storage device.

5. The interface circuit of claim 1, wherein each of the X and the Y is greater than one, the NVMe protocol processing circuit splits the first UAS command to generate the X NVMe commands, and the NVMe protocol processing circuit splits the second UAS command to generate the Y NVMe commands.

6. The interface circuit of claim 1, wherein the data buffer includes N storage spaces, the N is an integer greater than one, and the NVMe protocol processing circuit includes:

an NVMe command control circuit configured to execute at least following steps:

generating the X NVMe command(s) according to the first UAS command, and associating the X NVMe command(s) with X storage space(s) of the N storage spaces;

transmitting the X doorbell signal(s) to the storage device and thereby requesting the storage device to retrieve the X NVMe command(s) from the NVMe protocol processing circuit and to output the first stored data according to the X NVMe command(s);

generating the Y NVMe command(s) according to the second UAS command, and associating the Y NVMe command(s) with Y storage space(s) of the N storage spaces; and transmitting the Y doorbell signal(s) to the storage device and thereby requesting the storage device to retrieve the Y NVMe command(s) from the NVMe protocol processing circuit and to output the second stored data according to the Y NVMe command(s);

an NVMe direct memory access (DMA) control circuit configured to put the first stored data in the X storage space(s) and put the second stored data in the Y storage space(s); and an NVMe completion control circuit configured to reset all usage state(s) of the X storage space(s) after the first stored data are put in the X storage space(s), and the NVMe completion control circuit also configured to reset all usage state(s) of the Y storage space(s) after the second stored data are put in the Y storage space(s).

7. The interface circuit of claim 6, wherein the NVMe command control circuit associates the X NVMe command(s) with the X storage space(s) in accordance with the usage state(s) of the X storage space(s); and the NVMe command control circuit associates the Y NVMe command(s) with the Y storage space(s) in accordance with the usage state(s) of the Y storage space(s).

8. The interface circuit of claim 7, wherein each of the N storage spaces is tagged with an effective flag and a transmission flag; the NVMe command control circuit verifies the usage state(s) of the X storage space(s) according to the effective flag(s) and the transmission flag(s) of the X storage space(s); and the NVMe command control circuit verifies the usage state(s) of the Y storage space(s) according to the effective flag(s) and the transmission flag(s) of the Y storage space(s).

9. The interface circuit of claim 6, wherein the X NVMe command(s) include(s) address information of the X storage space(s) so that the storage device outputs X data signal(s) including the first stored data and the address information of the X storage space(s) according to the X NVMe command(s) and then the NVMe DMA control circuit puts the first stored data in the X storage space(s) according to the X data signal(s); the Y NVMe command(s) include(s) address information of the Y storage space(s) so that the storage device outputs Y data signal(s) including the second stored data and the address information of the Y storage space(s) according to the Y NVMe command(s) and then the NVMe DMA control circuit puts the second stored data in the Y storage space(s) according to the Y data signal(s).

10. The interface circuit of claim 6, wherein the NVMe completion control circuit resets the usage state(s) of the X storage space(s) according to a first completion notification from the storage device and transmits a first release doorbell signal to the storage device; and the NVMe completion control circuit resets the usage state(s) of the Y storage space(s) according to a second completion notification from the storage device and transmits a second release doorbell signal to the storage device.

11. The interface circuit of claim 10, wherein after the NVMe completion control circuit transmits the first release doorbell signal to the storage device, the NVMe command control circuit starts transmitting the Y doorbell signal(s) without regard to progress of the UAS protocol processing circuit transmitting the first stored data.

12. An interface circuit configured to couple a first interface with a second interface, the interface circuit comprising:

a first protocol processing circuit configured to receive a plurality of first protocol commands including a first command and a second command from a first device via the first interface and store the plurality of first protocol commands in an instruction register, and the first protocol processing circuit also configured to output first data and second data stored in a data buffer to the first device according to the first command and the second command respectively;

the instruction register configured to provide the plurality of first protocol commands for a second protocol processing circuit;

the data buffer configured to store the first data and the second data, wherein the first data and the second data are come from a second device; and the second protocol processing circuit electrically connecting with the second device via the second interface, the second protocol processing circuit configured to generate X second protocol command(s) according to the first command and thereby requesting the second device to output the first data to the data buffer through the second protocol processing circuit, and the second protocol processing circuit also configured to generate Y second protocol command(s) according to the second command before the first protocol processing circuit notifies the first device that the first data have been completely outputted, and thereby requesting the second device to output the second data to the data buffer through the second protocol processing circuit, wherein each of the X and the Y is a positive integer.

13. The interface circuit of claim 12, wherein the second protocol processing circuit checks the instruction register to obtain the plurality of first protocol commands.

14. The interface circuit of claim 12, wherein each of the X and the Y is greater than one; the second protocol processing circuit splits the first command to generate the X second protocol commands; the second protocol processing circuit splits the second command to generate the Y second protocol commands; the second protocol processing circuit uses the X second protocol commands to request the second device to output the first data; and the second protocol processing circuit uses the Y second protocol commands to request the second device to output the second data.

15. The interface circuit of claim 12, wherein the data buffer includes N storage spaces, the N is an integer greater than one, and the second protocol processing circuit includes:

a second protocol command control circuit configured to execute at least following steps:

generating the X second protocol command(s) according to the first command, and associating the X second protocol command(s) with X storage space(s) of the N storage spaces;

using the X second protocol command(s) to request the second device to output the first data to the X storage space(s) through the second protocol processing circuit;

generating the Y second protocol command(s) according to the second command, and associating the Y second protocol command(s) with Y storage space(s) of the N storage spaces; and using the Y second protocol command(s) to request the second device to output the second data to the Y storage space(s) through the second protocol processing circuit;

a second protocol direct memory access (DMA) control circuit configured to put the first data in the X storage space(s) and put the second data in the Y storage space(s); and a second protocol completion control circuit configured to reset all usage state(s) of the X storage space(s) after the first data are put in the X storage space(s), and the second protocol completion control circuit also configured to reset all usage state(s) of the Y storage space(s) after the second data are put in the Y storage space(s).

16. The interface circuit of claim 15, wherein the second protocol command control circuit associates the X second protocol command(s) with the X storage space(s) according to the usage state(s) of the X storage space(s); and the second protocol command control circuit associates the Y second protocol command(s) with the Y storage space(s) according to the usage state(s) of the Y storage space(s).

17. The interface circuit of claim 16, wherein each of the N storage spaces is tagged with an effective flag and a transmission flag; the second protocol command control circuit verifies the usage state(s) of the X storage space(s) according to the effective flag(s) and the transmission flag(s) of the X storage space(s); and the second protocol command control circuit verifies the usage state(s) of the Y storage space(s) according to the effective flag(s) and the transmission flag(s) of the Y storage space(s).

18. The interface circuit of claim 15, wherein after the first data are put in the X storage space(s), the second protocol command control circuit requests the second device to output the second data to the data buffer through the second protocol processing circuit without regard to progress of the first protocol processing circuit transmitting the first data.

19. The interface circuit of claim 12, wherein a data transmission speed of the first interface is slower than a data transmission speed of the second interface.

20. The interface circuit of claim 19, wherein the first interface is a USB interface and the second interface is a PCIe interface.

* * * * *